(12) United States Patent
Jan et al.

(10) Patent No.: US 7,780,203 B2
(45) Date of Patent: Aug. 24, 2010

(54) LATCHING MECHANISM

(75) Inventors: Te-Sheng Jan, Taipei Hsien (TW);
Yu-Tao Chen, Taipei Hsien (TW);
Chun-Che Yen, Taipei Hsien (TW);
Jian-Jun Li, Shenzhen (CN); Gang Cheng, Shenzhen (CN); Zheng-Qiang Song, Shenzhen (CN); Meng-Hua He, Shenzhen (CN); Bing-Jing Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 202 days.

(21) Appl. No.: 11/972,629

(22) Filed: Jan. 11, 2008

(65) Prior Publication Data
US 2009/0094808 A1      Apr. 16, 2009

(30) Foreign Application Priority Data
Oct. 15, 2007   (CN) .................... 2007 1 0202063

(51) Int. Cl.
*E05C 9/00*       (2006.01)
*E05C 19/06*      (2006.01)
(52) U.S. Cl. .......................... 292/27; 292/19
(58) Field of Classification Search ............ 292/1,
292/11, 19, 27, 49, 56, 80, 81, 83, 98, 197,
292/215, 245, 341.15, 341.16, 341.17, DIG. 4,
292/DIG. 37, DIG. 38 M; 361/679.57, 679.58;
220/324; 24/601.1, 662
See application file for complete search history.

(56) References Cited

U.S. PATENT DOCUMENTS

| | | | | | |
|---|---|---|---|---|---|
| 1,272,590 | A | * | 7/1918 | Wightman | 70/98 |
| 2,506,846 | A | * | 5/1950 | Teasdale | 70/58 |
| 2,508,846 | A | * | 5/1950 | Wallin | 601/43 |
| 4,500,120 | A | * | 2/1985 | Ridgewell et al. | 292/19 |
| 4,713,951 | A | * | 12/1987 | Ros | 70/456 R |
| 4,958,864 | A | | 9/1990 | Fischer et al. | 292/19 |
| 5,172,945 | A | * | 12/1992 | Doherty et al. | 292/49 |
| 5,275,027 | A | * | 1/1994 | Eklof et al. | 70/14 |
| 6,325,427 | B1 | * | 12/2001 | Daoud | 292/27 |

* cited by examiner

*Primary Examiner*—Peter M Cuomo
*Assistant Examiner*—Alyson M Merlino
(74) *Attorney, Agent, or Firm*—Frank R. Niranjan

(57) ABSTRACT

An exemplary latching mechanism (20) includes a base (22), a detachable portion (24), a rotatable wheel (25), and a resilient member (28). The base has two resilient hooks (224). The detachable portion has two clasping portion (244) for engaging with the resilient hooks. The rotatable wheel has a plurality of hook openers (256) and is rotatable between two states forced by the detachable portion. The resilient member is disposed between the base and detachable portion for providing elastic force. The at least one clasping portion of the detachable portion engages with the at least one resilient hook of the base and the rotatable wheel is at a second state. The rotatable wheel is rotated to a first state and the at least one resilient hook are pushed to deform by at least one of the hook openers of the rotatable wheel.

16 Claims, 6 Drawing Sheets

LATCHING MECHANISM

BACKGROUND OF THE INVENTION

1. Field of the Invention

The present invention relates to latching mechanisms, more particularly to a latching mechanism that is convenient to operate.

2. Discussion of the Related Art

Various types of consumer products such as toys, portable electronic devices, and most other devices with a mechanical feature usually includes two connected members. The connected members are usually designed to be latch to and/or unlatch from each other.

Typical connected members includes a main body and a cover. An end of each of the main body and the cover may be pivotably connected by a pivot shaft. A hook and a catch may be formed at another end of each of the main body and the cover, respectively. By pressing the cover downwards, the hook and the catch of the main body and the cover engages with each other, respectively, such that the cover is latched to the main body. By moving the hook or the catch in a predetermined direction, the hook detaches from the catch such that the cover becomes unlatched from the main body.

However, when opening the cover, a relative large force may need to be applied to move the hook or the catch. Therefore, it is inconvenient to operate. In addition, actions of opening and closing the cover, of different products may not be similar, thus users may need to change the action of his/her hand(s) frequently when opening or closing the cover of different products. That further increases the inconvenience of operation.

Therefore, a latching mechanism which is convenient to be operated is desired.

SUMMARY

An exemplary latching mechanism includes a base, a detachable portion, a rotatable wheel, and a resilient member. The base has two resilient hooks. The detachable portion has two clasping portion for engaging with the resilient hooks of the base. The rotatable wheel has a plurality of hook openers and is rotatable between a first state and a second state forced by the detachable portion. The elastic member is disposed between the base and detachable portion for providing elastic force. The at least one clasping portion of the detachable portion engages with the at least one resilient hook of the base and the rotatable wheel is at the second state. The rotatable wheel is rotated to the first state and the at least one resilient hook are pushed to deform by at least one of the hook openers of the rotatable wheel, thus the at least one clasping portion of the detachable portion disengages from the at least one resilient hook of the base.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present latching mechanism. Moreover, in the drawings, like reference numerals designate corresponding parts throughout the several views, and all the views are schematic.

DETAILED DESCRIPTION OF THE EMBODIMENTS

The present invention provides a latching mechanism usually employed in products such as electronic devices and toys.

Figure 1:
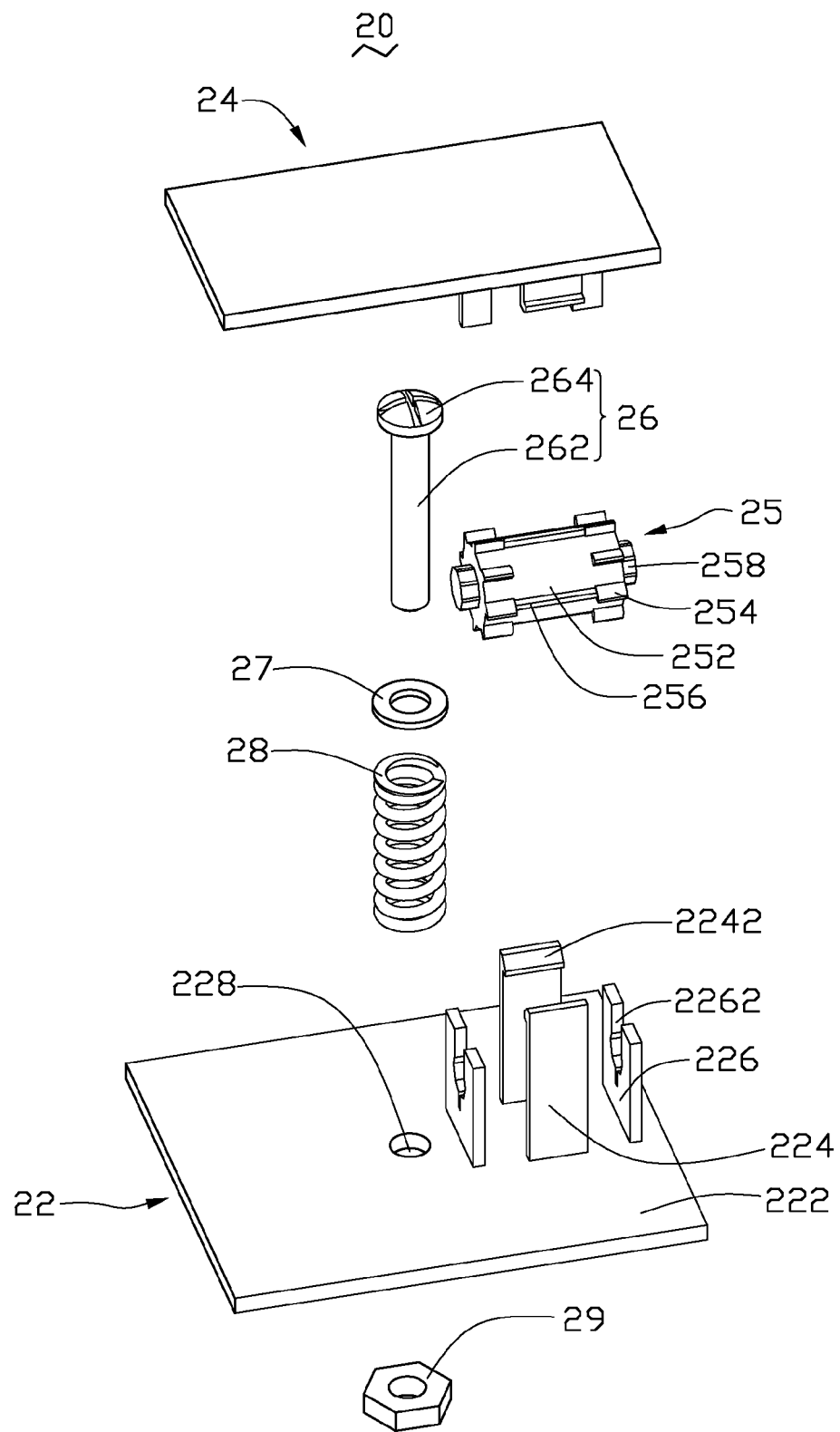
FIG. 1 is an exploded, isometric view of an embodiment of a latching mechanism of the present invention.
Figure 2:
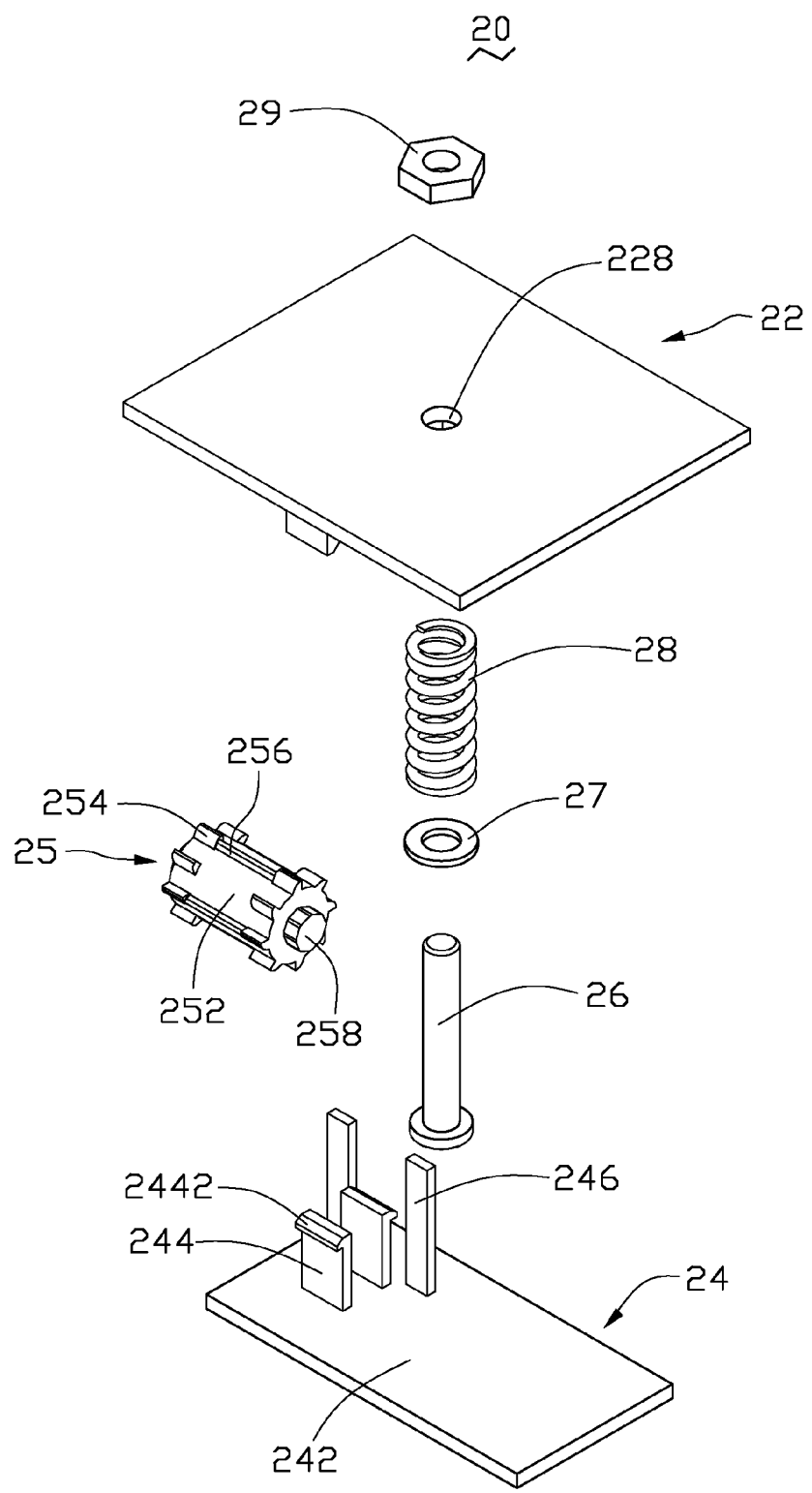
FIG. 2 is similar to FIG. 1, but viewed from another aspect.

Referring to FIG. 1 and FIG. 2, a latching mechanism 20 of an embodiment of the present invention includes a base 22, a detachable portion 24, a rotatable wheel 25, a shaft 26, a washer 27, a resilient member 28, and a fixing member 29.

The base 22 includes a main sheet 222, two resilient hooks 224 extending perpendicularly from a top surface the main sheet 222, and two brackets 226 perpendicularly extending from the top surface of the main sheet 222. The resilient hooks 224 have a height taller than that of the brackets 226. The main sheet 222 is substantially a flat sheet defining a through hole 228 therein. Each exposing end of the resilient hooks 224 includes a hook end 2242. The resilient hooks 224 are aligned as mirror image of each other, with the hook ends 2242 of the resilient hooks 224 pointing toward each other. The two brackets 226 are aligned as mirror image of each other, and a first parallel axis between the 226 intersects a second parallel axis between the 2242 at substantially 90 degrees. Each bracket 226 defines a cutout 2262 having a regular octagon-shaped hole.

The detachable portion 24 includes a press receiving portion 242, two clasping portions 244, and two actuators 246. The press receiving portion 242 is substantially a flat sheet. The clasping portions 244 and the actuators 246 extend perpendicularly from a bottom surface of the press receiving portion 242 toward the bottom side of the detachable portion 24. A clasp 2442 is formed at one end of each clasping portion 244. The clasping portions 244 are aligned as mirror image of each other with the clasps 2442 of the clasping portions 244 pointing away from each other. The actuators 246 have a height taller than that of the clasping portions 244. The two actuators 246 are disposed at a side of the clasping portions 244. A maximal distance between the clasps 2442 of the clasping portions 244 is slightly larger than a shortest distance between the hook ends 2242 of the resilient hooks 224, such that the clasps 2442 can engage with the hook ends 2242 when the clasps 2442 and the hook ends 2242 are pushed against each other.

The rotatable wheel 25 includes a cylindrical main portion 252, a plurality of wheel pedals 254, a plurality of hook openers 256, and two engaging ends 258. The wheel pedals 254 are aligned on opposite ends of a cylindrical surface of the main portion 252 adjacent end surfaces of the main portion 252 radially. In other words, the wheel pedals 254 are formed at a cylindrical surface of the main portion 252 in pairs. A pair of wheel pedals 254 are disposed at opposite ends of an axis on the cylindrical surface between the ends of the main portion 252. In this embodiment, eight pairs of wheel pedals 254 are evenly arranged along the cylindrical surface of the main portion 252, that is, a radial angle between adjacent pairs of wheel pedals 254 is 45 degrees. The hook openers 256 protrude between every other pairs of adjacent wheel pedals 254 on the cylindrical surface of the main portion 252. That is, a radial angle between adjacent hook openers 256 is 90 degrees, and there are four hook openers 256. A diameter of the main body 252 is approximately equal to a distance between the two resilient hooks 224 of the base 22, and a distance between opposite extending hook openers 256 on a same radial plane is larger than the distance between the two resilient hooks 224. The engaging ends 258 are formed at two ends of the main body 252 and are aligned along a same axis. Each engaging end 258 has a regular octagon-shaped cross-section corresponding to the regular octagon-shaped hole of the cutout 2262 of the base 22.

The shaft 26 includes a shaft portion 262 and a shaft head 264. The shaft portion 262 and the shaft head 264 are cylindrical, and a diameter of the shaft head 264 is larger than that of the shaft portion 262. A screw thread (not shown) is defined on the shaft portion 262.

The washer 27 is ring-shaped. The elastic member 28 is a compressed, spiral spring. The fixing member 29 is a nut configured for engaging with the screw thread of the shaft 26.

Figure 3:
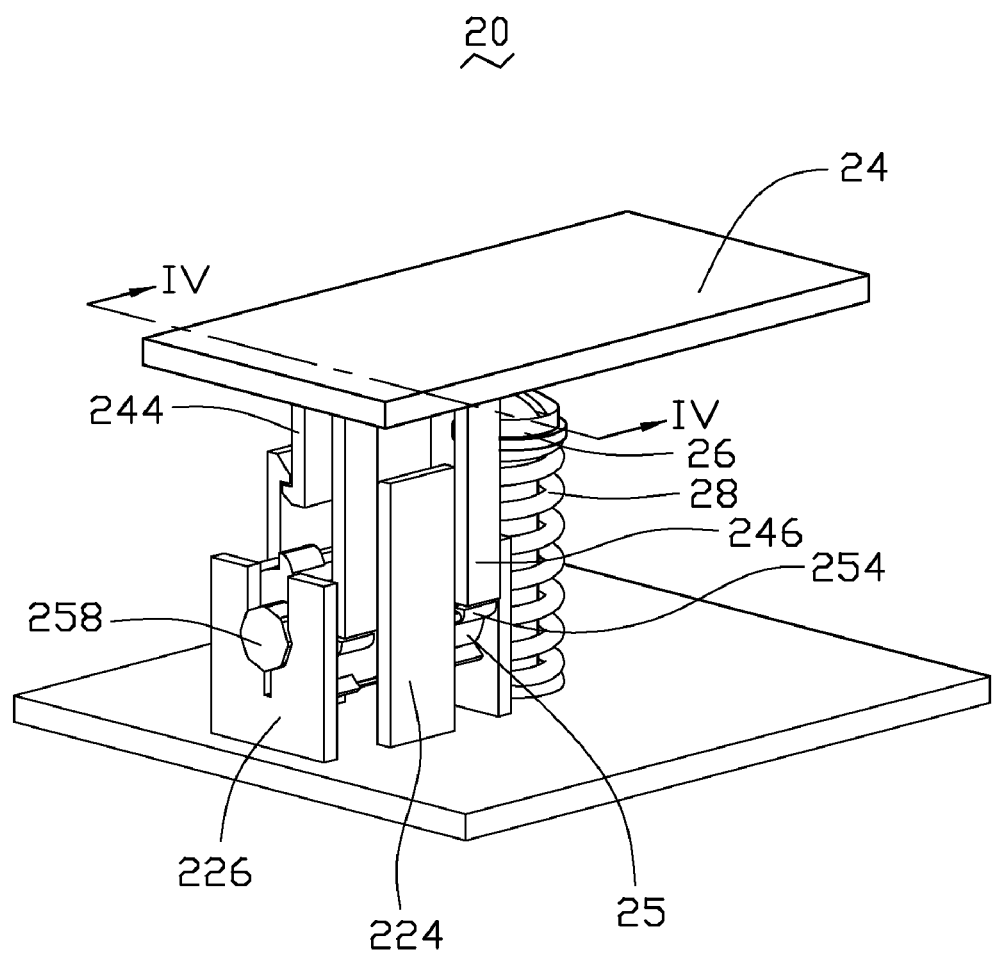
FIG. 3 is an assembled, isometric view of the latching mechanism of FIG. 1.

In assembling, referring to FIG. 3, a hinge (not shown) is assembled to the base 22 and one end of the detachable portion 24 at a distance from the clasping portions 244 and the actuators 246, thus allowing a rotation between the detachable portion 24 and the base 22. Alternatively, the hinge can be omitted and the detachable portion 24 is connected to the base 22 via the resilient hooks 224 and the clasping portions 244 only. The rotatable wheel 25 is supported between the brackets 226 of the base 22 with the engaging ends 258 of the rotatable wheel 25 engaging in the cutout 2262 of the brackets 226. The rotatable wheel 25 has two rotatable states. The rotatable wheel 25 is disposed also between the resilient hooks 224 of the base 22, such that the rotatable wheel 25 when applied a force, and the hook openers 256 of the rotatable wheel 25 can rotate against the resilient hooks 224 and push the resilient hooks 224 to deform. The shaft portion 262 of the shaft 26 runs through the washer 27, the elastic member 28, and the through hole 228 of the base 22 in that order, and then the fixing member 29 engages with an end of the shaft 26 opposite to the shaft head 264. The fixing member 29 is tightened such that the elastic member 28 is slightly compressed between the washer 27 and the base 22 below the press receiving portion 242 of the detachable portion 24.

Figure 5:
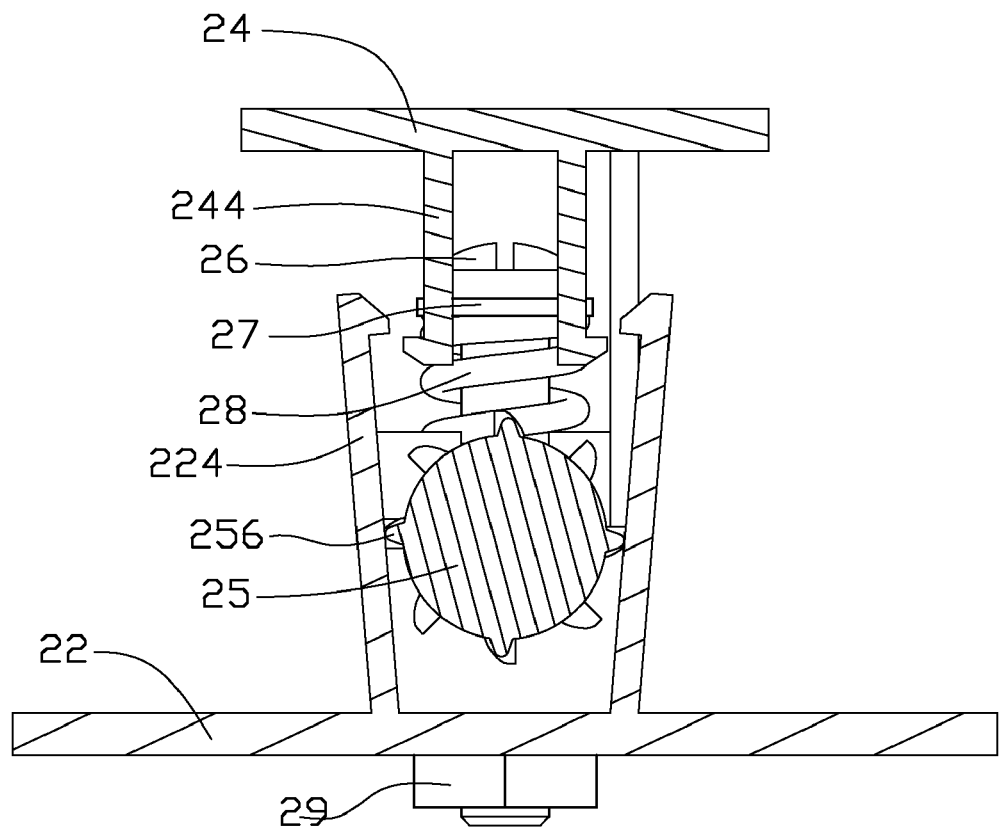
FIG. 5 is a cross-sectional view of the latching mechanism of FIG. 1 at a second state taken along line IV-IV in FIG. 3.

In a first state, referring to FIG. 5, two hook openers 256 on opposite sides of the rotatable wheel 25 abuts the resilient hooks 224 of the base 22 correspondingly. In other words, the resilient hooks 224 of the base 22, pushed by the hook openers 256, deforms and spread away from each other, as a result, a distance between the hook ends 2242 is greater than a maximal distance between the clasps 2442. This allows the clasping portions 244 of the detachable portion 24 to move freely between the hooks ends 2242 of the base 22 linearly relative to the base 22. When the resilient hooks 224 are deformed, the detachable portion 24 is detachable from the base 22.

Figure 4:
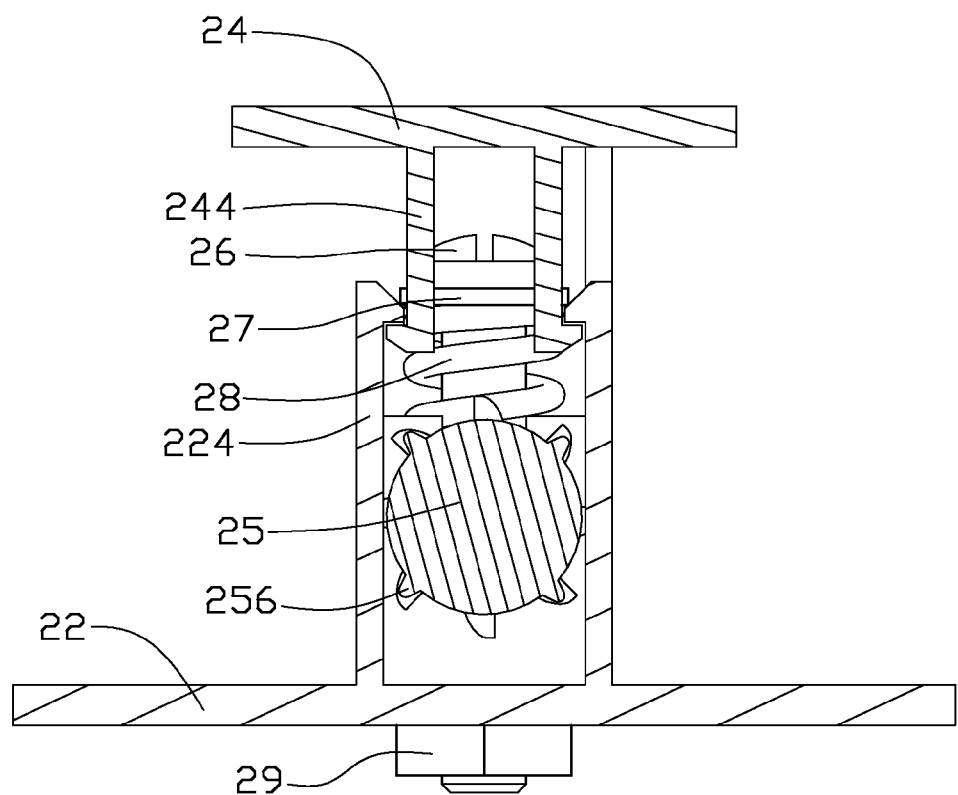
FIG. 4 is a cross-sectional view of the latching mechanism of FIG. 1 at a first state taken along line IV-IV in FIG. 3.

In a second state, referring to FIG. 4, the hook openers 256 of the rotatable wheel 25 does not push against the resilient hooks 224 of the base 22. Thus, the resilient hooks 224 are at rest and a distance between the resilient hooks 224 of the base 22 is smaller than that between the clasps 2442 of the detachable portions 24. When the resilient hooks 224 are not deformed, the detachable portion 24 is latched to the base 22.

When detachable portion 24 is in a closed (latched) position and the rotatable wheel 25 is in the second state, the clasps 2442 are positioned adjacent to the resilient hooks 224 of the base 22 between the hook ends 224 and the main sheet 222 correspondingly. Thus, the resilient hooks 224 engages with the clasping portions 244 such that the clasps 2442 blocks the hook ends 224 from moving away from the base 22.

To detach (open) the detachable portion 24 relative to the base 22, the detachable portion 24 is pushed towards the main sheet 222 of the base 22. The actuators 246 of the detachable portion 24 pushes a corresponding pair of wheel pedals 254 downwards and the state of the rotatable wheel 25 changes to the first state. The rotatable wheel 25 stops rotating after rotating at an angle of 45 degrees because the engaging ends 258 of the rotatable wheel 25 have a regular octagon-shaped cross-section. Furthermore, the press receiving portion 242 of the detachable portion 24 pushes the shaft head 264 of the shaft 26 after the detachable portion 24 moves in a predetermined distance. The shaft 26 and the fixing member 29 are pushed away from the detachable portion 24, further compressing the resilient member 28. When the detachable portion 24 is released from pushing, an elastic force of the compressed resilient member 28 pushes the shaft 26 and the fixing member 29 to return to their original position.

To latch (close) the detachable portion 24 to the base 22, the detachable portion 24 is pushed again towards the main sheet 222 of the base 22. The actuators 246 of the detachable portion 24 push a corresponding pair of wheel pedals 254 downwards, and the state of the rotatable wheel 25 changes to the second state again. The rotatable wheel 25 rotates at another angle of 45 degrees and the detachable portion 24 is latched to the base 22.

Figure 6:
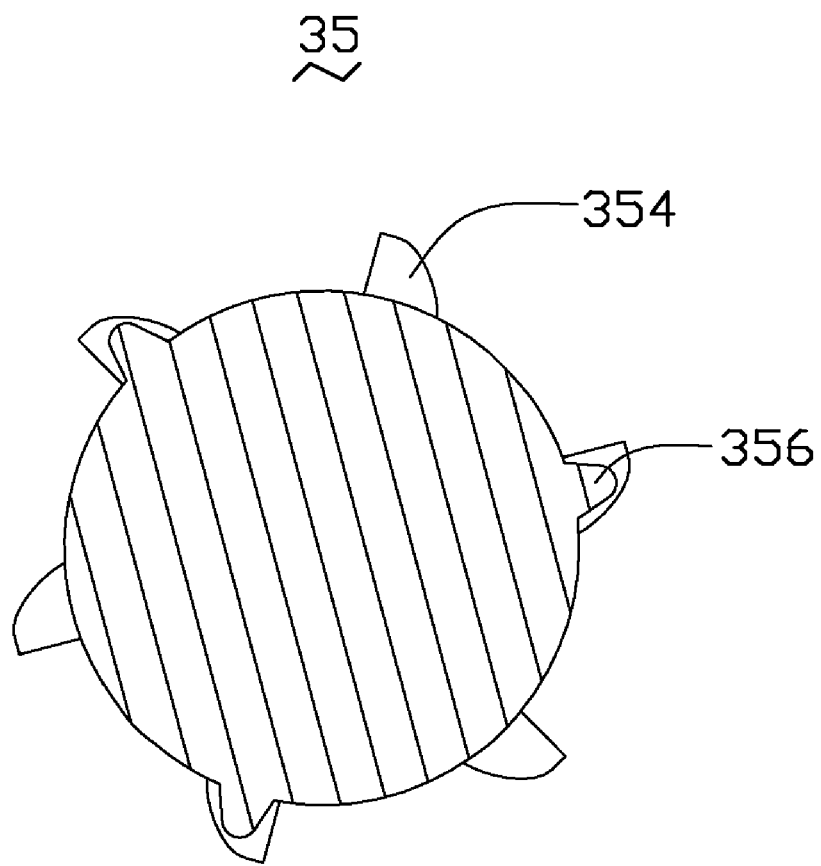
FIG. 6 is a cross-sectional view of a rotatable wheel of an alternative embodiment of the latching mechanism of FIG. 1.

Alternatively, the radial angle between adjacent pairs of wheel pedals 254 of the rotatable wheel 25 may be any other degrees besides 45 degrees so long as a hook opener 256 is between every other pair of adjacent pairs of wheel pedals 254. With the condition, a shape of the cross-section of the engaging ends 258 of the rotatable wheel 25 and a shape of the cutout 2262 of the base 22 should be varied accordingly. For example, referring to FIG. 6, there are six pairs of actuators 354 and three hook openers 356, and a radial angle between adjacent pairs of actuators 354 is 60 degrees. A hook opener 356 is formed between one pair of every two pairs of adjacent actuators 354. Accordingly, engaging ends (not shown) have a regular hexagon-shaped cross-section.

Alternatively, the washer 27 may be omitted. The fixing member 29 may also be a ring and the shaft 26 defines a ring-shaped groove for engaging with the ring. The fixing member 29 may also be omitted. With the condition, the shaft 26 may be riveted after assembling. The resilient member 28 may also be other type of resilient members such as rubber sticks or sponges. The shaft 26 may be omitted. In this case, the resilient member 28 is lengthened. Facing directions of the clasps 2442 and the hook ends 2242 may be exchanged with each other. The latching mechanism 20 may include a single resilient hook 224 on the base 22, a single clasping portion 244 and a single actuator 246 on the detachable portion.

In using the latching mechanism 20, with a same action on the detachable portion 24 of pressing the detachable portion 24, the detachable portion 24 can be latched on or detached from the base 22. In the process of latching or detaching the detachable portion 24, a user can operate on the latching mechanism 20 without changing the action of his/her hand. Therefore, the latching mechanism 20 is very convenient. Especially when repeatedly latching and detaching the detachable portion 24, this convenience is much more remarkable.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A latching mechanism, comprising:
   a base having at least one resilient hook;
   a detachable portion for connecting to the base, the detachable portion including a press receiving portion, at least one clasping portion for engaging with the at least one resilient hook of the base, and at least one actuator; the at least one clasping portion and the at least one actuator being formed on the press receiving portion;

a rotatable wheel including a plurality of hook openers, the rotatable wheel being rotatable between a first state and a second state forced by the detachable portion; and a resilient member disposed between the base and the detachable portion for providing elastic force to force the detachable portion to move away from the base;

wherein the at least one clasping portion of the detachable portion engages with the at least one resilient hook of the base when the rotatable wheel is at the second state, when the press receiving portion of the detachable portion is pressed in a first direction, the at least one actuator of the detachable portion rotates the rotatable wheel about an axis perpendicular to the first direction to the first state and the at least one resilient hook is pushed to deform by at least one of the hook openers of the rotatable wheel, thus the at least one clasping portion of the detachable portion disengages from the at least one resilient hook of the base.

2. The latching mechanism as claimed in claim 1, wherein the resilient member is a compressed, spiral spring.

3. The latching mechanism as claimed in claim 1, further comprising a shaft, the shaft running through the resilient member and the base.

4. The latching mechanism as claimed in claim 3, wherein the latching mechanism further comprises a washer and a fixing member, the shaft includes a shaft head and a shaft portion, the washer is sleeved on the shaft portion of the shaft and is disposed between the resilient member and the shaft head, and the fixing member is fixed on an end opposite to the shaft head of the shaft so that the base, the resilient member and the washer are positioned between the shaft head and the fixing member.

5. The latching mechanism as claimed in claim 1, wherein the at least one actuator has a height taller than that of the at least one clasping portion of the detachable portion.

6. The latching mechanism as claimed in claim 5, wherein the at least one resilient hook of the base includes two resilient hooks, the at least one clasping portion of the detachable portion includes two clasping portions, and the at least one actuator of the detachable portion includes two actuators.

7. The latching mechanism as claimed in claim 6, wherein the base further has a main sheet, the two resilient hooks are formed on the main sheet, each resilient hook has a hook end at an end thereof, the two resilient hooks are aligned as mirror images of each other, with the hook ends of the resilient hooks pointing toward each other.

8. The latching mechanism as claimed in claim 7, wherein the press receiving portion is substantially a flat sheet, the clasping portions and the actuators perpendicularly extends from the press receiving portion.

9. The latching mechanism as claimed in claim 8, wherein each clasping portion of the detachable portion forms a clasp at one end thereof, the clasping portions are aligned as mirror images of each other, with the clasps of the clasping portions pointing away from each other.

10. The latching mechanism as claimed in claim 9, wherein a maximum distance between the clasps of the clasping portions is slightly larger than a shortest distance between the hook ends of the resilient hooks.

11. The latching mechanism as claimed in claim 10, wherein the rotatable wheel further comprises two engaging ends formed at two opposite ends thereof, the base further comprises two brackets formed on the main sheet, each bracket defines a cutout for engaging with the engaging ends of the rotatable wheel so as to restrict a rotary angle of each step of the rotatable wheel.

12. The latching mechanism as claimed in claim 11, wherein the rotatable wheel further comprises a plurality of wheel pedals grouped into a plurality of groups, the wheel pedals and the hook openers are arranged along a direction of a cylindrical surface, each hook opener is disposed corresponding to every other groups of adjacent groups of wheel pedal, when the press receiving portion of the detachable portion is pressed to disengage the detachable portion from the base, the at least one actuator of the detachable portion pushes one of the groups of wheel pedal.

13. The latching mechanism as claimed in claim 12, wherein the rotatable wheel further comprises a cylindrical main portion, each group of wheel pedal is a pair of wheel pedals, the wheel pedals are aligned on opposite ends of a cylindrical surface of the main portion radially and each pair of wheel pedals are disposed at opposite ends of an axis on the cylindrical surface between the ends of the main portion, the hook openers protrudes between every other pairs of adjacent wheel pedals on the cylindrical surface of the main portion, the engaging ends are formed at two ends of the main body and are co-axial with the main body, each engaging end has a regular octagon-shaped cross-section, and the cutouts of the base have a regular octagon hole for engaging with the engaging ends.

14. The latching mechanism as claimed in claim 13, wherein a diameter of the main body is approximately equal to a distance between the two resilient hooks of the base, and a distance between outmost surfaces of two opposite hook openers is larger than the distance between the two resilient hooks.

15. A latching mechanism, comprising:
a base having at least one resilient hook;
a detachable portion having at least one clasping portion for engaging with the at least one resilient hook of the base and at least one actuator a resilient member disposed between the base and the detachable portion for providing elastic force to force the detachable portion to move away from the base; and
a rotatable wheel mounted on the base, the rotatable wheel having at least one hook opener, the at least one hook opener of the rotatable wheel configured for forcing the at least one resilient hook of the base to deform, the rotatable wheel being rotatable about an axis of the rotatable wheel from a second state to a first state by pushing the at least one actuator of the detachable portion in a direction perpendicular to the axis of the rotatable wheel to rotate the rotatable wheel so that the at least one resilient hook is pushed to deform by the at least one hook opener of the rotatable wheel.

16. The latching mechanism as claimed in claim 15, wherein the at least one resilient hook of the base disengages from the at least one clasping portion of the detachable portion when the at least one resilient hook is deformed, and when the at least one resilient hook of the base is engaged with the at least one clasping portion of the detachable portion, the at least one resilient hook is not deformed.

* * * * *